(12) United States Patent
Huang et al.

(10) Patent No.: US 12,724,190 B2
(45) Date of Patent: Sep. 1, 2026

(54) BACKLIGHT MODULE

(71) Applicant: InnoLux Corporation, Miao-Li County (TW)

(72) Inventors: Chih-Jung Huang, Miao-Li County (TW); Lei-Jie Du, Miao-Li County (TW); Meng Gao, Miao-Li County (TW); Ling-Jian Huang, Miao-Li County (TW); Sheng-Jian Shen, Miao-Li County (TW); Guang-Lei Zhang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 150 days.

(21) Appl. No.: 18/774,298

(22) Filed: Jul. 16, 2024

(65) Prior Publication Data

US 2025/0052941 A1 Feb. 13, 2025

(30) Foreign Application Priority Data

Aug. 7, 2023 (CN) ........................ 202310985775.8

(51) Int. Cl.

| | |
|---|---|
| ***G02F 1/29*** | (2006.01) |
| ***F21V 8/00*** | (2006.01) |
| ***G02F 1/1335*** | (2006.01) |
| ***G02F 1/13357*** | (2006.01) |

(52) U.S. Cl.

CPC ........... *G02B 6/0045* (2013.01); *G02B 6/002* (2013.01); *G02B 6/0073* (2013.01); *G02B 6/0076* (2013.01); *G02B 6/0091* (2013.01); *G02F 1/133603* (2013.01); *G02F 1/133605* (2013.01); *G02F 1/133607* (2021.01); *G02F 1/133615* (2013.01)

(58) Field of Classification Search

CPC .. G02B 6/0045; G02B 6/002; G02F 1/133607
USPC ........................................................ 362/97.1
See application file for complete search history.

(56) References Cited

U.S. PATENT DOCUMENTS

| | | | | |
|---|---|---|---|---|
| 2013/0286679 | A1* | 10/2013 | Chen | G02B 6/0051 362/625 |
| 2016/0238774 | A1* | 8/2016 | Koike | G02B 6/005 |
| 2019/0025646 | A1* | 1/2019 | Han | G02F 1/133605 |
| 2019/0113673 | A1* | 4/2019 | Shiau | G02B 6/0038 |
| 2019/0324192 | A1* | 10/2019 | Park | G02B 6/0088 |
| 2019/0324328 | A1* | 10/2019 | Chen | G02B 5/0278 |
| 2021/0165277 | A1* | 6/2021 | Park | G02F 1/133611 |
| 2024/0027830 | A1* | 1/2024 | Lee | G02F 1/133603 |

FOREIGN PATENT DOCUMENTS

| | | |
|---|---|---|
| CN | 207704063 U | 8/2018 |
| CN | 110426775 A | 11/2019 |

* cited by examiner

*Primary Examiner* — Christopher M Raabe
(74) *Attorney, Agent, or Firm* — MUNCY, GEISSLER, OLDS & LOWE, P.C.

(57) ABSTRACT

A backlight module includes: a back plate; a first optical film disposed on the back plate; and a second optical film disposed on the first optical film. The first optical film includes a plurality of first protrusions that protrude toward the second optical film, and at least one of the plurality of first protrusions has a first height. The first height is greater than or equal to 4 μm and smaller than or equal to 10 μm.

16 Claims, 4 Drawing Sheets

BACKLIGHT MODULE

CROSS-REFERENCE TO RELATED APPLICATIONS

This application claims the benefits of the Chinese Patent Application Serial Number 202310985775.8, filed on Aug. 7, 2023, the subject matter of which is incorporated herein by reference.

BACKGROUND

Field of the Disclosure

The present disclosure relates to a backlight module and, more particularly, to a backlight module with an optical film.

Description of Related Art

With the rapid advancement of liquid crystal display (LCD) manufacturing technology and its advantages of being thin, light, power-saving, and free of radiation, the liquid crystal displays are widely used in various electronic products such as tablet computers, notebook computers, digital cameras, digital video cameras, mobile phones, computer monitors and LCD TVs. The liquid crystal displays require backlight modules to provide light sources to display images.

However, current backlight modules still have shortcomings such as low assembly yield or high production cost. Therefore, there is a need to provide an improved backlight module to alleviate and/or obviate the above defects.

SUMMARY

The present disclosure provides a backlight module, which includes: a back plate; a first optical film disposed on the back plate; and a second optical film disposed on the first optical film, wherein the first optical film includes a plurality of first protrusions that protrude toward the second optical film, and at least one of the plurality of first protrusions has a first height, where the first height is greater than or equal to 4 μm and smaller than or equal to 10 μm.

Other novel features of the disclosure will become more apparent from the following detailed description when taken in conjunction with the accompanying drawings.

DETAILED DESCRIPTION OF EMBODIMENT

Figure 1A:
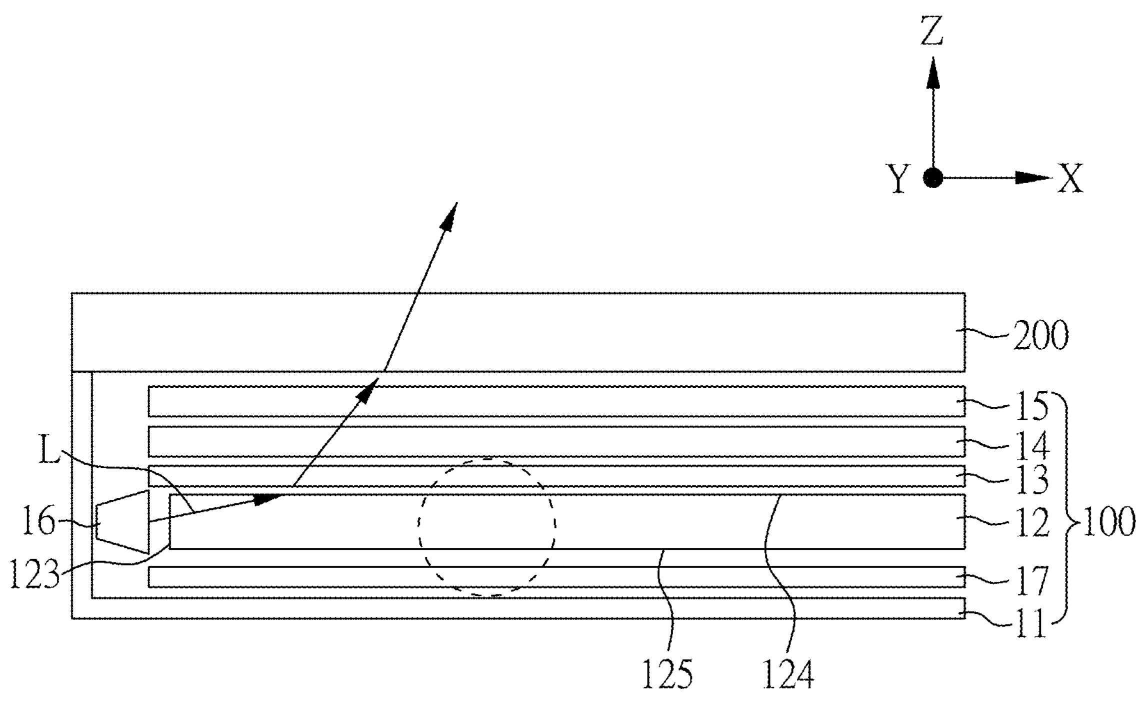
FIG. 1A is a schematic diagram of an electronic device according to an embodiment of the present disclosure.

The following provides different embodiments of the present disclosure. These embodiments are used to illustrate the technical content of the present disclosure, rather than to limit the claims of the present disclosure. A feature of one embodiment can be applied to other embodiments through suitable modification, substitution, combination, and separation.

It should be noted that, in the specification and claims, unless otherwise specified, having "one" element is not limited to having a single said element, but one or more said elements may be provided. In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "comprising", "containing" and "having" are open-ended words, and should be interpreted as meaning "including but not limited to". Accordingly, when the terms "comprising", "containing" and/or "having" are used in the description of the present disclosure, they specify the presence of the corresponding features, regions, steps, operations and/or components, but do not exclude the presence of one or more corresponding features, regions, steps, operations and/or components.

In the description, the terms "almost", "about", "approximately" or "substantially" usually means within 10%, 5%, 3%, 2%, 1% or 0.5% of a given value or range. The quantity given here is an approximate quantity; that is, without specifying "almost", "about", "approximately" or "substantially", it can still imply the meaning of "almost", "about", "approximately" or "substantially". In addition, the term "range of the first value to the second value" or "range between the first value and the second value" indicates that the range includes the first value, the second value, and other values in between.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way. Unless there is a special definition in the embodiment of the present disclosure.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side. When the corresponding member (such as a film or region) is described as "on another member", it may be directly on the other member, or there may be other members between the two members. On the other hand, when a member is described as “directly on another member”, there is no member between the two members. In addition, when a member is described as “on another member”, the two members have a vertical relationship in the top view direction, and this member may be above or below the other member, while the vertical relationship depends on the orientation of the device.

In the present disclosure, the height and distance may be measured using an optical microscope, and the height and distance may be obtained by measuring a cross-sectional image in an electron microscope, but the present disclosure is not limited thereto. In addition, there may be certain errors between any two values or directions used for comparison. If the first value is equal to the second value, it implies that there may be an error of about 10% between the first value and the second value. If the first direction is perpendicular to the second direction, the angle between the first direction and the second direction may be 80 to 100 degrees. If the first direction is parallel to the second direction, the angle between the first direction and the second direction may be 0 to 10 degrees.

It should be noted that the technical solutions provided by the different embodiments described hereinafter may be used interchangeably, combined or mixed to form another embodiment without violating the spirit of the present disclosure.

Figure 1B:
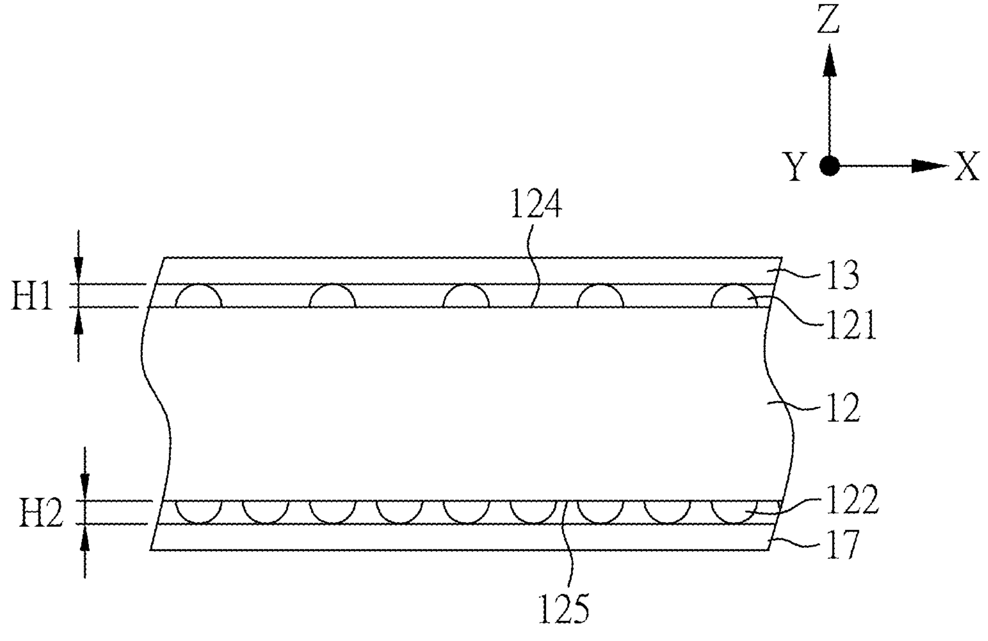
FIG. 1B is an enlarged view of a portion of the electronic device of FIG. 1A.

FIG. 1A is a schematic diagram of an electronic device according to an embodiment of the present disclosure. FIG. 1B is an enlarged view of a portion of the electronic device of FIG. 1A.

In one embodiment of the present disclosure, as shown in FIG. 1A, the electronic device may include: a backlight module 100; and a panel 200 disposed on the backlight module 100. Therefore, the electronic device of the present disclosure may be an electronic device that requires a backlight module, such as a liquid crystal display, but it is not limited thereto. In addition, the panel 200 may be, for example, a flexible display panel, a touch display panel, a curved display panel or a tiled display panel. However, the present disclosure is not limited thereto. The electronic device of the present disclosure may be, for example, a monitor, a mobile phone, a notebook computer, a video camera, a camera, a music player, a mobile navigation device, a television set, etc., but it is not limited thereto.

In the present disclosure, as shown in FIG. 1A and FIG. 1B, the backlight module 100 may include: a back plate 11; a first optical film 12 disposed on the back plate 11; and a second optical film 13 disposed on the first optical film 12. The first optical film 12 includes a plurality of first protrusions 121. The plurality of first protrusions 121 protrude toward the second optical film 13, and at least one of the plurality of first protrusions 121 has a first height H1, wherein the first height H1 is greater than or equal to 4 μm and smaller than or equal to 10 μm. The first height H1 may be measured as, for example, the length of the first protrusion 121 in the normal direction Z of the second optical film 13. By arranging the first protrusions 121 and designing the first height H1 of the first protrusion 121 to be within the above range, the present disclosure may reduce the damage to the first optical film 12 and/or the second optical film 13 caused by the foreign matter and improve the assembly yield of the backlight module 100, thereby reducing the production cost of the electronic device. In the present disclosure, as shown in FIG. 1B, the first protrusions 121 may be in direct contact with the second optical film 13, but the present disclosure is not limited thereto.

In the present disclosure, the material of the back plate 11 may include metal, alloy, polycarbonate (PC), polyimide (PI), polypropylene (PP), polyethylene terephthalate (PET) or other plastic or polymer materials, or a combination of the above, but it is not limited thereto. In the present disclosure, the first optical film 12 and the second optical film 13 each may be a light guide plate, a diffusion plate, a brightness enhancement film, a lens, or a combination thereof, but the present disclosure is not limited thereto. The materials of the first optical film 12 and the second optical film 13 may each include poly(methyl methacrylate) (PMMA), polycarbonate (PC), polyimide (PI), polyethylene terephthalate (PET), polymer polyol (POP), cycloolefin polymer (COP), rubber, glass, other suitable materials or a combination of the above, but it is not limited thereto. In the present disclosure, the first protrusions 121 may be formed by injection molding, dot printing, glue dispensing, hot pressing, ink-jet printing (IJP), or other suitable methods, or a combination of the above, but it is not limited thereto. In one embodiment of the present disclosure, when the first protrusions 121 are formed by an injection molding method, the first optical film 12 and the first protrusions 121 may be may be integrally formed. The materials of the first protrusions 121 may each include poly(methyl methacrylate) (PMMA), polycarbonate (PC), polyimide (PI), polyethylene terephthalate (PET), polymer polyol (POP), cycloolefin polymer (COP), rubber, glass, metal, other suitable materials or a combination of the above. In the present disclosure, the diameter of the first protrusion 121 may be 40 μm to 60 μm, but the present disclosure is not limited thereto. When the diameter of the protrusion is 40 μm to 60 μm, it is able to achieve better optical quality and process yield.

In the present disclosure, as shown in FIG. 1A, the backlight module 100 may further include: a plurality of light emitting units 16 disposed on one side of the first optical film 12; and a reflective sheet 17 disposed on the back plate 11. More specifically, the first optical film 12 may include a side wall 123, and the light emitting unit 16 is disposed corresponding to the side wall 123 of the first optical film 12. Therefore, the light L provided by the light emitting unit 16 may enter the first optical film 12 through the side wall 123 of the first optical film 12, and is guided to the panel 200 through the first optical film 12. Therefore, in one embodiment of the present disclosure, the first optical film 12 may be a light guide plate, and the side wall 123 may be the light incident side of the light guide plate, but the present disclosure is not limited thereto. The reflective sheet 17 may reflect the light L provided by the light emitting unit 16 to the first optical film 12 so as to improve the utilization of the light L. In the present disclosure, the light emitting unit 16 may include a light emitting diode, such as an organic light emitting diode (OLED), a sub-millimeter light emitting diode (mini LED), or a micro light emitting diode (micro LED) or quantum dot light emitting diode (quantum dot LED, which may include QLED, QDLED), fluorescence, phosphor or other suitable materials, or a combination of the above, but the disclosure is not limited thereto. In the present disclosure, the material of the reflective sheet 17 may include metal, white ink, other reflective materials, or a combination of the above. The metal may include gold, silver, copper, aluminum or a combination thereof, but the present disclosure is not limited thereto. The white ink may include white polyimide, resin, or a combination thereof, but the present disclosure is not limited thereto. In addition, the reflective sheet 17 may be a single-layer or multi-layer structure.

In one embodiment of the present disclosure, as shown in FIG. 1A, the backlight module 100 may optionally include a third optical film 14 and/or a fourth optical film 15 disposed on the second optical film 13, wherein the third optical film 14 may be disposed between the second optical film 13 and the fourth optical film 15. The third optical film 14 and the fourth optical film 15 may be used to improve the light extraction efficiency of the backlight module 100 and/or improve the display quality of the electronic device. In the present disclosure, the third optical film 14 and the fourth optical film 15 may be prepared using the same or different materials, and the materials of the third optical film 14 and the fourth optical film 15 are similar to those of the first optical film 12 and the second optical film 13 so that a detailed description is deemed unnecessary. In addition, in the present disclosure, although not shown in the figures, an adhesive layer may be optionally included among the second optical film 13, the third optical film 14 and/or the fourth optical film 15, so that the second optical film 13, the third optical film 14 and/or the fourth optical film 15 are bonded to each other through an adhesive layer to form an optical film set, but the present disclosure is not limited thereto. The materials for the adhesive layer may include polyvinyl butyral (PVB), ethylene vinyl acetate (EVA), thermoplastic polyurethane (TPU), optical clear adhesive (OCA), optical clear resin (OCR), other suitable materials or a combinations of the above, but the present disclosure is not limited thereto.

In the present disclosure, as shown in FIG. 1B, the first optical film 12 may include a plurality of second protrusions 122. The plurality of second protrusions 122 protrude toward the back plate 11 (as shown in FIG. 1A), and at least one of the plurality of second protrusions 122 has a second height H2, wherein the second height H2 may be greater than or equal to 4 μm and smaller than or equal to 10 μm. By arranging the second protrusions 122 and designing the second height H2 of the second protrusion 122 to be within the above range, the present disclosure may improve the light extraction efficiency of the backlight module 100 and/or improve the display quality of the electronic device. In one embodiment of the present disclosure, the second protrusions 122 may be in direct contact with the reflective sheet 17, but the present disclosure is not limited thereto. The second height H2 may be measured as, for example, the length of the second protrusion 122 in the normal direction Z of the second optical film 13.

In the present disclosure, the second protrusions 122 may be prepared using the same or different methods as those used to form the first protrusions 121, and thus a detailed description is deemed unnecessary. In one embodiment of the present disclosure, when the second protrusions 122 are formed by injection molding, the first optical film 12 and the second protrusions 122 may be integrally formed. The materials of the second protrusions 122 may each include poly(methyl methacrylate) (PMMA), polycarbonate (PC), polyimide (PI), polyethylene terephthalate (PET), polyether polyol (POP), cycloolefin polymer (COP), rubber, glass, metal, other suitable materials, or a combination of the above.

Figures 2A, 2B:
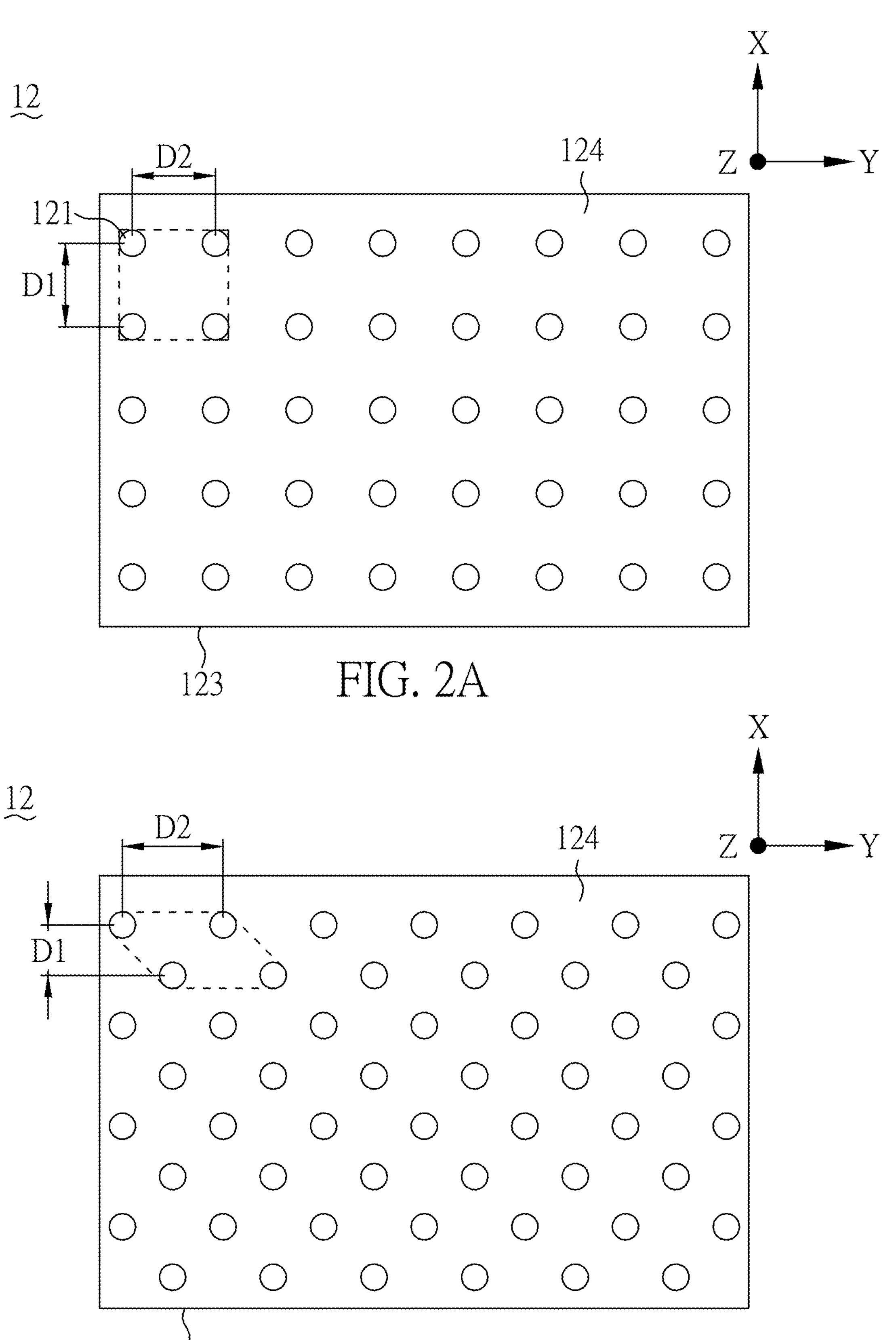
FIG. 2A is a schematic top view of the first optical film according to an embodiment of the present disclosure.
FIG. 2B is a schematic top view of the first optical film according to an embodiment of the present disclosure.

FIG. 2A is a schematic top view of the first optical film according to an embodiment of the present disclosure.

In one embodiment of the present disclosure, as shown in FIGS. 1A to 1B and FIG. 2A, the first optical film 12 may include an upper surface 124, wherein the upper surface 124 is connected to the side wall 123, and the first protrusions 121 may be formed on the upper surface 124. As shown in FIG. 2A, the first protrusions 121 may be arranged in a rectangular pattern. In more detail, four adjacent first protrusions 121 may be connected to form a rectangle. In the present disclosure, the distance D1, D2 between adjacent first protrusions 121 may be 2 mm to 10 mm. The "distance between adjacent first protrusions" may be, for example, the distance D1 between two adjacent first protrusions 121 (for example, the centers of two adjacent first protrusions 121) along the direction X, or the distance D2 between two adjacent first protrusions 121 (for example, the centers of two adjacent first protrusions 121) along the direction Y, where the direction X is different from the direction Y (for example, direction X may be perpendicular to direction Y). In one embodiment of the present disclosure, as shown in FIG. 2A, the distance D1 between adjacent first protrusions 121 along the X direction may be substantially equal to the distance D2 between adjacent first protrusions 121 along the Y direction, but the present disclosure is not limited thereto.

In addition, in the present disclosure, the density of the first protrusions 121 may be 0.1% to 0.8%, for example, it may be 0.1% to 0.5%, 0.1% to 0.3%, 0.3% to 0.5% or 0.5% to 0.8%, or a combination thereof, but the present disclosure is not limited thereto. The "density of first protrusions" may be, for example, in the area surrounded by four adjacent first protrusions 121 (taking the outer tangent line of the first protrusions 121, as shown by the dotted line) in a top view direction (for example, in the Z direction), a ratio of the total area of the four first protrusions 121 to the area surrounded by the four first protrusions 121.

FIG. 2B is a schematic top view of the first optical film according to an embodiment of the present disclosure. The first optical film in FIG. 2B is similar to the first optical film in FIG. 1A except that the arrangement of the first protrusions is different.

In one embodiment of the present disclosure, as shown in FIG. 2B, the first protrusions 121 may be arranged in a rhombus pattern. In more detail, four adjacent first protrusions 121 may be connected to form a rhombus. In the present disclosure, the distance D1, D2 between adjacent first protrusions 121 may be 2 mm to 10 mm. The "distance between adjacent first protrusions" may be, for example, the distance D1 between two adjacent first protrusions 121 (for example, the centers of two adjacent first protrusions 121) along the direction X, or may be the distance D2 between two adjacent first protrusions 121 (for example, the centers of two adjacent first protrusions 121) along the direction Y, where the direction X is different from the direction Y (for example, direction X may be perpendicular to direction Y). In one embodiment of the present disclosure, as shown in FIG. 2B, the distance D1 between adjacent first protrusions 121 along the X direction X may not be equal to the distance D2 between adjacent first protrusions 121 along the direction Y, but the present disclosure is not limited thereto.

In addition, in the present disclosure, the density of the first protrusions 121 may be 0.1% to 0.8%, for example, it may be 0.1% to 0.5%, 0.1% to 0.3%, 0.3% to 0.5% or 0.5% to 0.8%, or a combination thereof, but the present disclosure is not limited thereto. The "density of first protrusions" may be, for example, in the area surrounded by four adjacent first protrusions 121 (taking the outer tangent line of the first protrusions 121, as shown by the dotted line) in a top view direction (for example, the Z direction), a ratio of the total area of the four first protrusions 121 to the area surrounded by the four first protrusions 121.

Figure 2C:
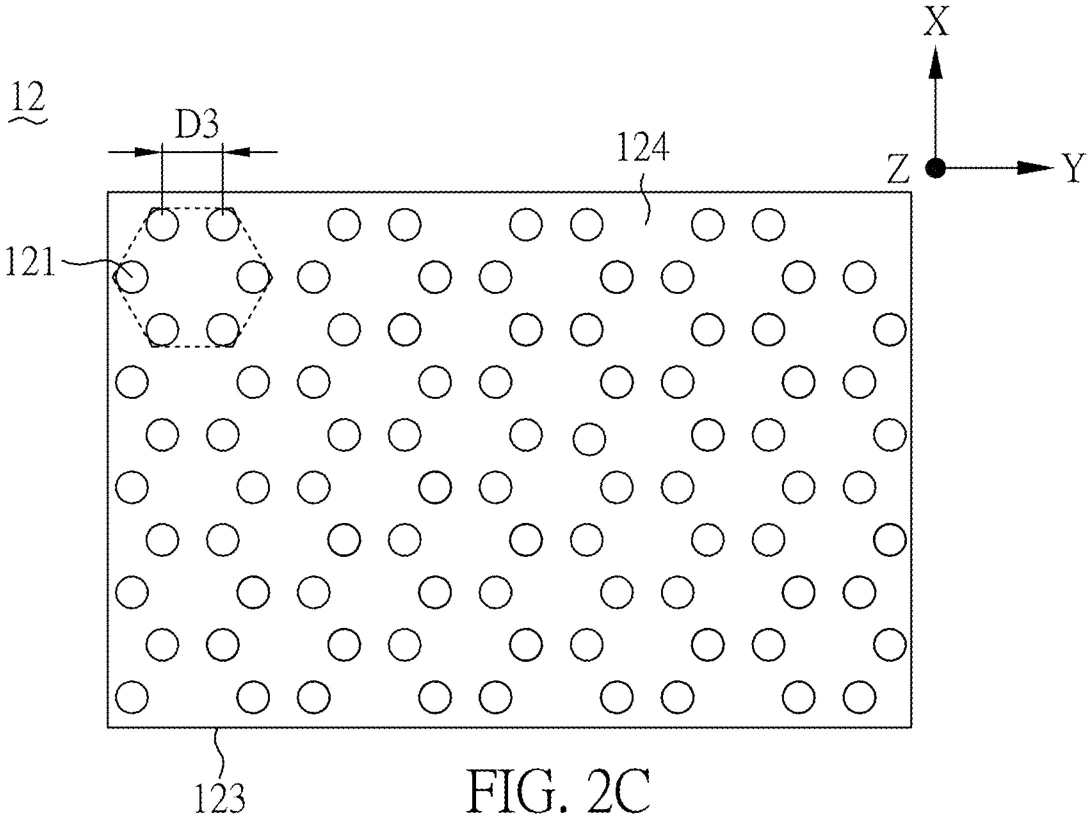
FIG. 2C is a schematic top view of the first optical film according to an embodiment of the present disclosure.

FIG. 2C is a schematic top view of the first optical film according to an embodiment of the present disclosure, wherein the first optical film in FIG. 2C is similar to the first optical film in FIG. 1A, except that the arrangement of the first protrusions is different.

In one embodiment of the present disclosure, as shown in FIG. 2C, the first protrusions 121 may be arranged in a honeycomb pattern. In more detail, six adjacent first protrusions 121 may be connected to form a hexagon. In the present disclosure, the distance D3 between adjacent first protrusions 121 (for example, centers of adjacent first protrusions 121) may be 2 mm to 10 mm. The "distance between adjacent first protrusions" may be, for example, the length of one side of a hexagon. In one embodiment of the present disclosure, as shown in FIG. 2C, six adjacent first protrusions 121 may be connected to form a regular hexagon. Therefore, the length of each side of the regular hexagon may be equal. However, the present disclosure is not limited thereto.

In addition, in the present disclosure, the density of the first protrusions 121 may be 0.1% to 0.8%, for example, it may be 0.1% to 0.5%, 0.1% to 0.3%, 0.3% to 0.5% or 0.5% to 0.8%, or a combination thereof, but the present disclosure is not limited thereto. The "density of first protrusions" may be, for example, in the area surrounded by six adjacent first protrusions 121 (taking the outer tangent line of the first protrusions 121, as shown by the dotted line) in a top view direction (for example, the Z direction), a ratio of the total area of the six first protrusions 121 to the area surrounded by the six first protrusions 121.

Figure 3:
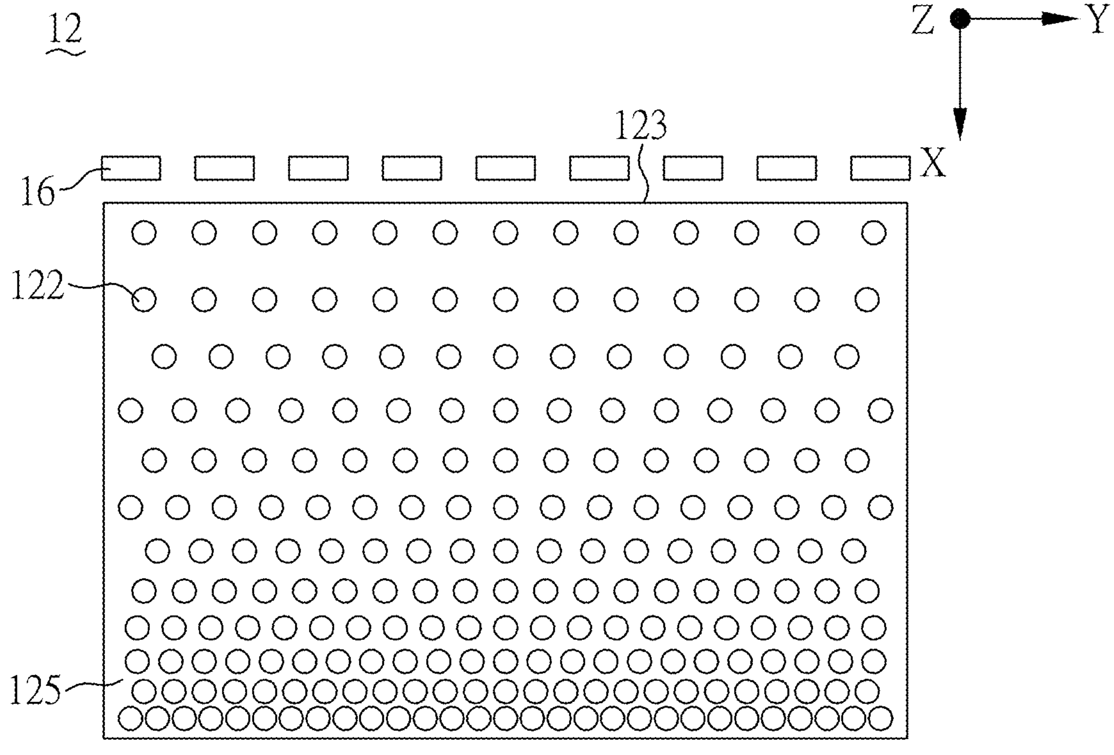
FIG. 3 is a schematic bottom view of the first optical film according to an embodiment of the present disclosure.

FIG. 3 is a schematic bottom view of the first optical film according to an embodiment of the present disclosure.

In one embodiment of the present disclosure, as shown in FIGS. 1A to 1B and FIG. 3, the first optical film 12 may include a plurality of second protrusions 122, and the plurality of second protrusions 122 protrude toward the back plate 11. More specifically, the first optical film 12 may include a lower surface 125, wherein the lower surface 125 is connected to the side wall 123, and the second protrusion 122 may be formed on the lower surface 125. The light emitting unit 16 is disposed on one side of the first optical film 12, wherein the density of the second protrusions 122 adjacent to this side may be smaller than the density of the second protrusions 122 away from the side. In the present disclosure, the density of the second protrusions 122 may be 1% to 50%. For example, the density of the second protrusions 122 adjacent to this side may be 1% to 3%, and the density of the second protrusions 122 away from this side may be 1% to 3%. The density may be 30% to 50% (for example, 35% to 45%, 30% to 40% or 40% to 50%), but the present disclosure is not limited thereto. Therefore, in the present disclosure, the density of the first protrusions 121 may be smaller than the density of the second protrusions 122. The "density of second protrusions" may be, for example, in the area surrounded by a plurality of adjacent second protrusions 122 in a top view direction (for example, the Z direction), a ratio of the total area of the plurality of adjacent second protrusions 122 to the area surrounded by the plurality of second protrusions 122. In one embodiment of the present disclosure, the "density of the second protrusions" may be, for example, when taking one unit area of the lower surface 125, a ratio of the total area of the second protrusions 122 under the unit area to the unit area.

In one embodiment of the present disclosure, as shown in FIG. 3, a plurality of light emitting units 16 may be disposed along the direction Y, wherein the density of the second protrusions 122 adjacent to the light emitting units 16 is smaller than the density of the second protrusions 122 away from the light emitting units 16. The density of the second protrusions 122 adjacent to the light emitting units 16 may be 1% to 3%, and the density of the second protrusions 122 away from the light emitting units 16 may be 30% to 50%. The terms "adjacent to" and "away from" mentioned herein are relative. When taking the second protrusions 122 for comparison, the one with the smaller shortest distance between the second protrusion 122 and the light emitting unit 16 is "adjacent to" and the one with the greater shortest distance between the second protrusion 122 and the light emitting unit 16 is "away from". Taking FIG. 3 as an example, the shortest distance between the second protrusion 122 and the light emitting unit 16 is the distance in the X direction between the second protrusion 122 and the light emitting unit 16.

Figure 4A:
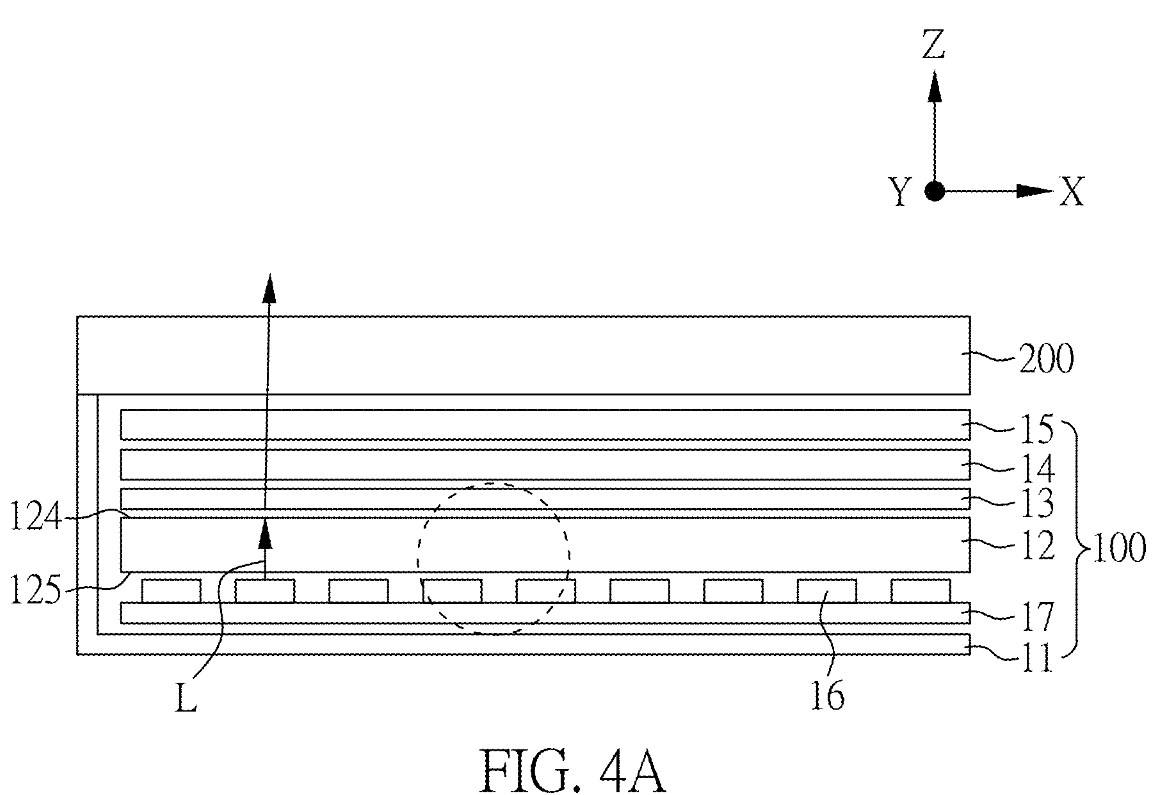
FIG. 4A is a schematic diagram of an electronic device according to an embodiment of the present disclosure.
Figure 4B:
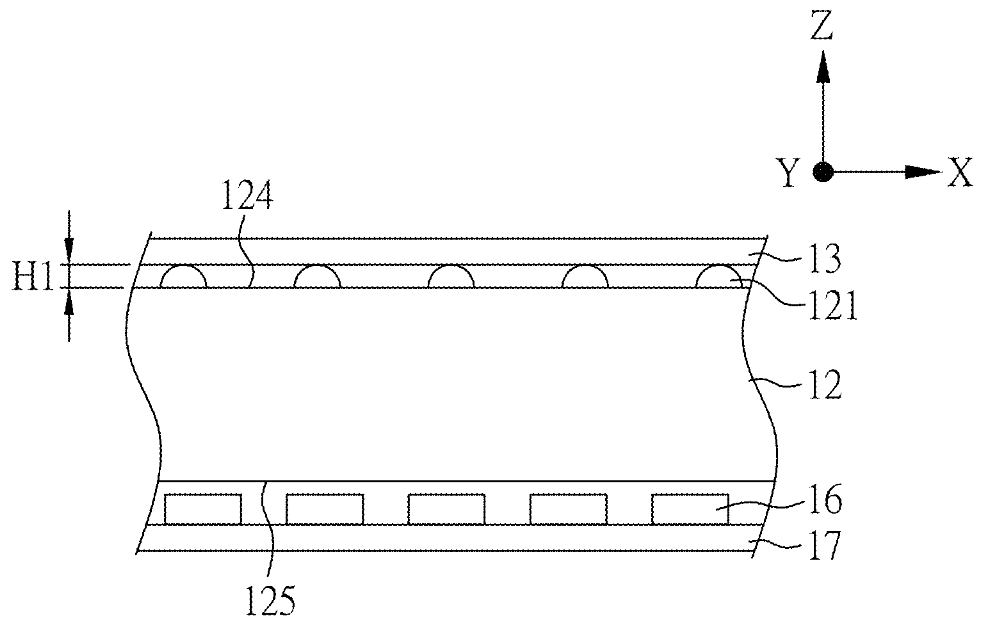
FIG. 4B is an enlarged view of a portion of the electronic device of FIG. 4A.

FIG. 4A is a schematic diagram of an electronic device according to an embodiment of the present disclosure. FIG. 4B is an enlarged view of a portion of the electronic device of FIG. 4A. The electronic device of FIG. 4A is similar to that of FIG. 1A except for the following differences.

In one embodiment of the present disclosure, as shown in FIG. 4A and FIG. 4B, a plurality of light emitting units 16 may be disposed on the reflective sheet 17, wherein the plurality of light emitting units 16 may be disposed on the first optical film 12 and the reflective sheet 17 or back plate 11. More specifically, the light emitting units 16 may be disposed on a plane in the direction X and direction Y. Therefore, the light L provided by the light emitting units 16 may enter from the lower surface 125 of the first optical film 12 for being provided to the panel 200. In one embodiment of the disclosure, the backlight module 100 may be a direct backlight module, but the present disclosure is not limited thereto.

In one embodiment of the present disclosure, as shown in FIG. 4A and FIG. 4B, when the backlight module 100 is a direct backlight module, the first optical film 12 may not have the second protrusions 122 (as shown in FIG. 4B), which can simplify the process steps or save costs. In addition, other features of the first optical film 12 may be as described above and will not be described again here.

The aforementioned specific embodiments should be construed as merely illustrative, and not limiting the rest of the present disclosure in any way.

The invention claimed is:

1. A backlight module comprising:

a back plate;

a first optical film disposed on the back plate; and a second optical film disposed on the first optical film, wherein the first optical film includes a plurality of first protrusions that protrude toward the second optical film and a plurality of second protrusions that protrude toward the back plate, and at least one of the plurality of first protrusions has a first height, where the first height is greater than or equal to 4 μm and smaller than or equal to 10 μm;

wherein a density of the plurality of first protrusions is 0.1% to 0.5%, and a density of the plurality of second protrusions is 1% to 50%;

wherein the plurality of first protrusions are in direct contact with the second optical film.

2. The backlight module as claimed in claim 1, wherein the first protrusion has a diameter of 40 μm to 60 μm.

3. The backlight module as claimed in claim 1, wherein a distance between adjacent first protrusions is 2 mm to 10 mm.

4. The backlight module as claimed in claim 1, wherein at least one of the plurality of second protrusions has a second height, and the second height is greater than or equal to 4 μm, and smaller than or equal to 10 μm.

5. The backlight module as claimed in claim 1, further comprising a plurality of light emitting units disposed on one side of the first optical film, wherein a density of the plurality of second protrusions adjacent to the side is smaller than a density of the plurality of second protrusions away from the side.

6. The backlight module as claimed in claim 5, wherein the density of the plurality of second protrusions adjacent to the side is 1% to 3%.

7. The backlight module as claimed in claim 5, wherein the density of the plurality of second protrusions away from the side is 30% to 50%.

8. The backlight module as claimed in claim 5, further comprising a reflective sheet disposed on the back plate.

9. The backlight module as claimed in claim 1, wherein the plurality of first protrusions are arranged in a rectangular pattern in which four adjacent first protrusions are connected to form a rectangle.

10. The backlight module as claimed in claim 1, wherein the plurality of first protrusions are arranged in a rhombus pattern in which four adjacent first protrusions are connected to form a rhombus.

11. The backlight module as claimed in claim 1, wherein the plurality of first protrusions are arranged in a honeycomb pattern in which six adjacent first protrusions are connected to form a hexagon.

12. The backlight module as claimed in claim 1, further comprising: a reflective sheet disposed on the back plate; and a plurality of light emitting units disposed on the reflective sheet, wherein the plurality of light emitting units are disposed between the first optical film and the reflective sheet.

13. The backlight module as claimed in claim 8, wherein the plurality of second protrusions are in direct contact with the reflective sheet.

14. The backlight module as claimed in claim 1, wherein the first optical film and the plurality of first protrusions are integrally formed.

15. The backlight module as claimed in claim 1, wherein the first optical film and the plurality of second protrusions are integrally formed.

16. The backlight module as claimed in claim 1, wherein the backlight module further includes a third optical film and a fourth optical film that are disposed on the second optical film, wherein the third optical film is disposed between the second optical film and the fourth optical film.

* * * * *